June 10, 1924.  
J. R. MOFFATT  
SEMIAUTOMATIC HOSE SHAPING MACHINE  
Filed March 24, 1921 13 Sheets-Sheet 1

Inventor  
James R. Moffatt  
By  
Sturtevant Mason  
Attorneys

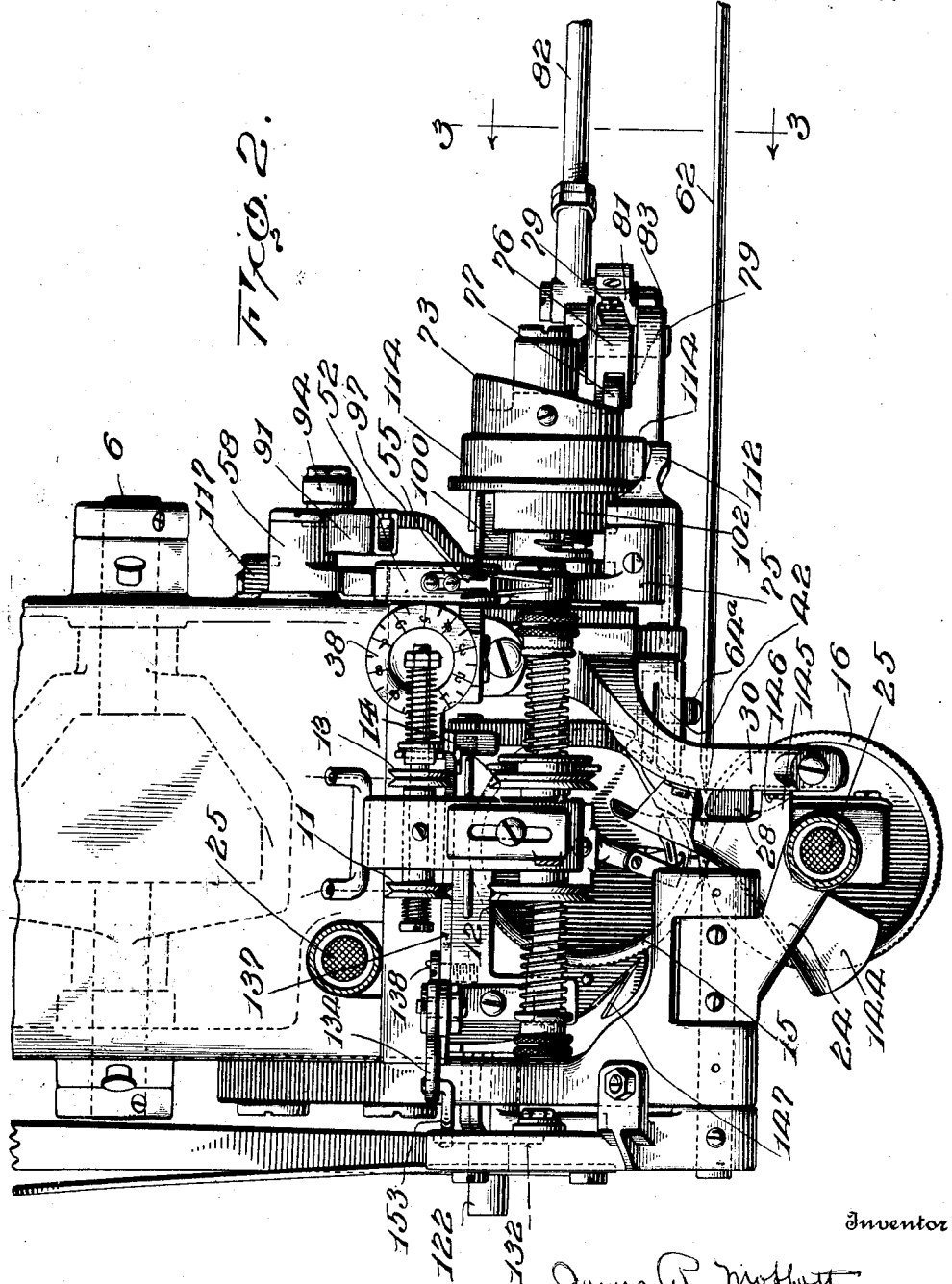

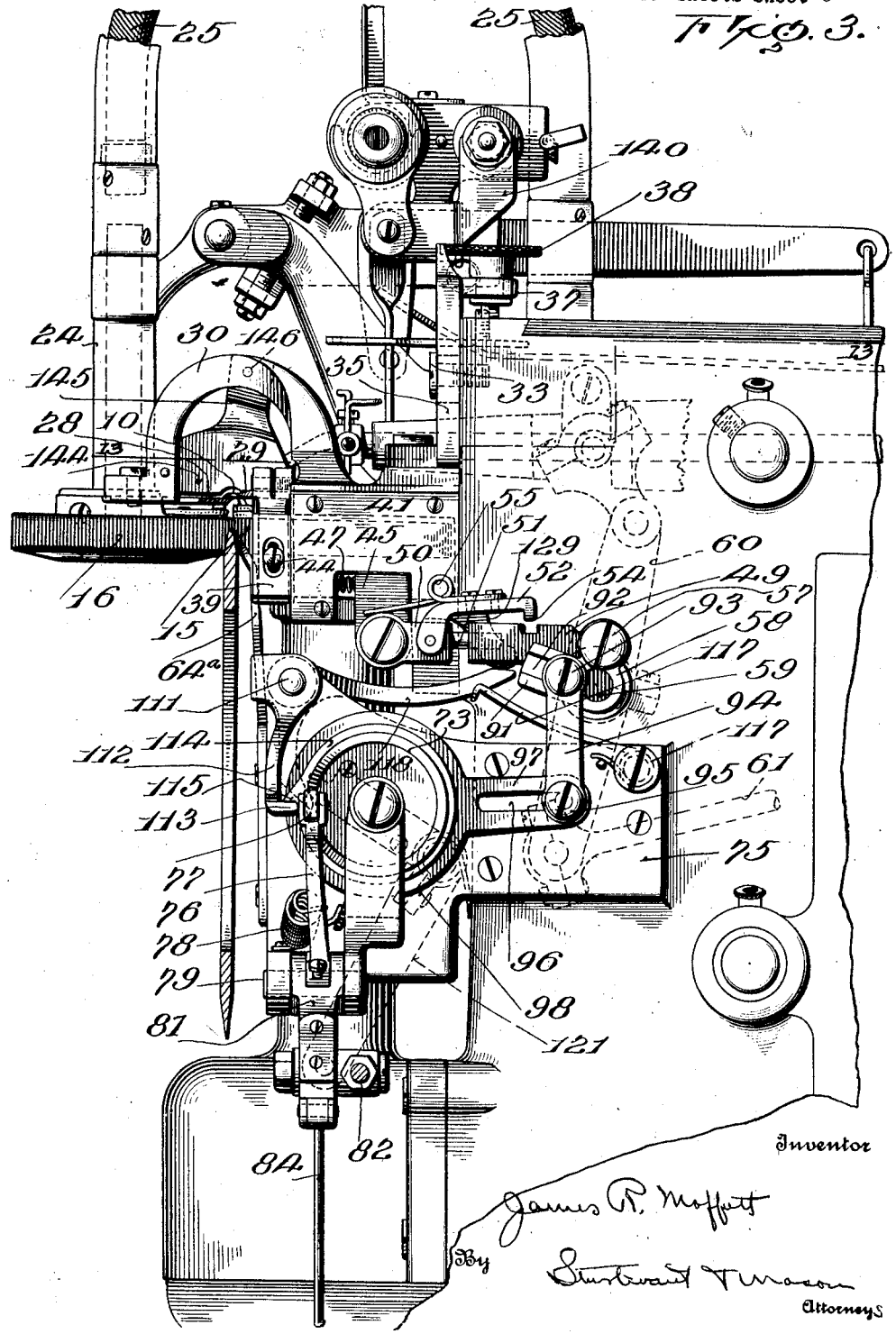

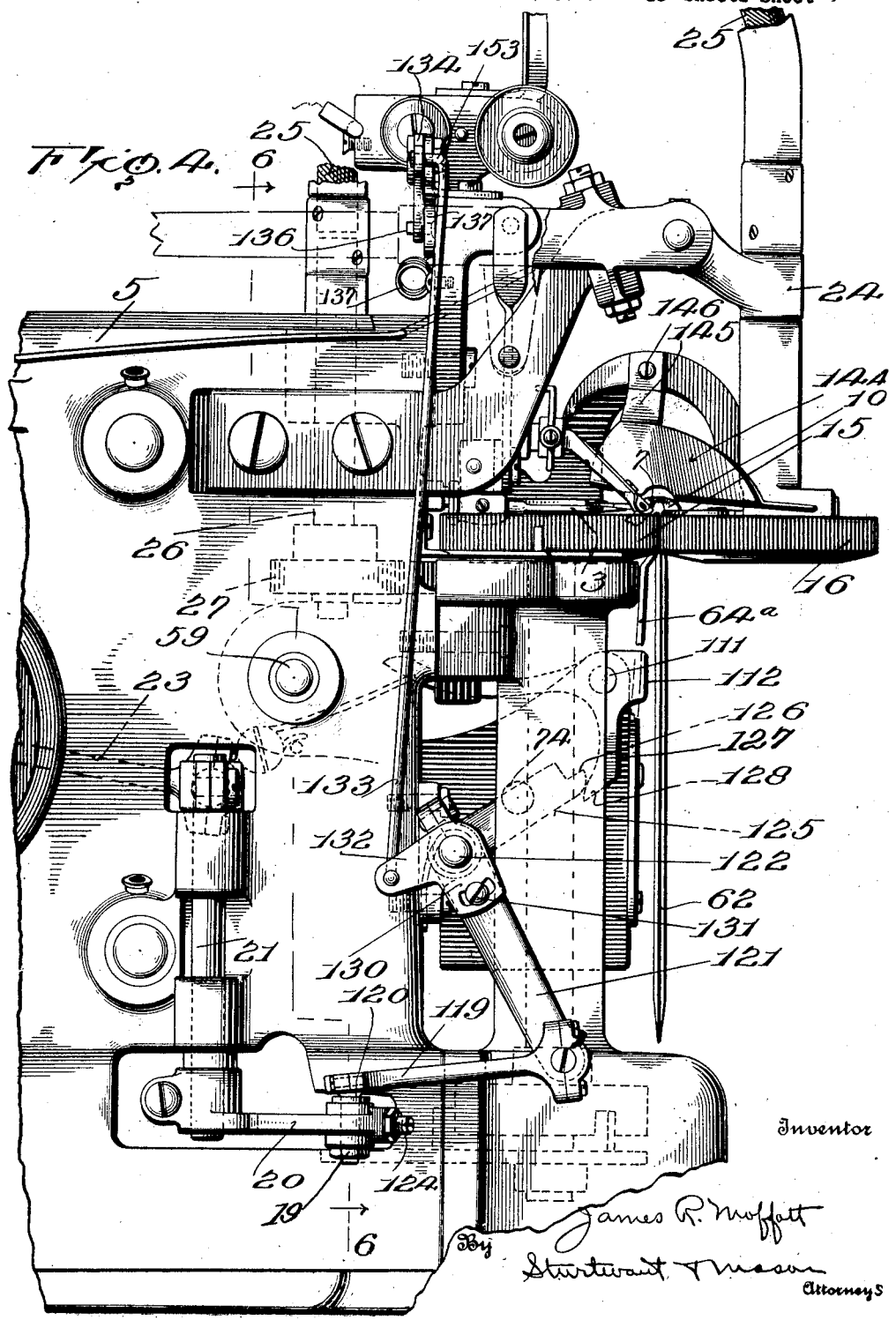

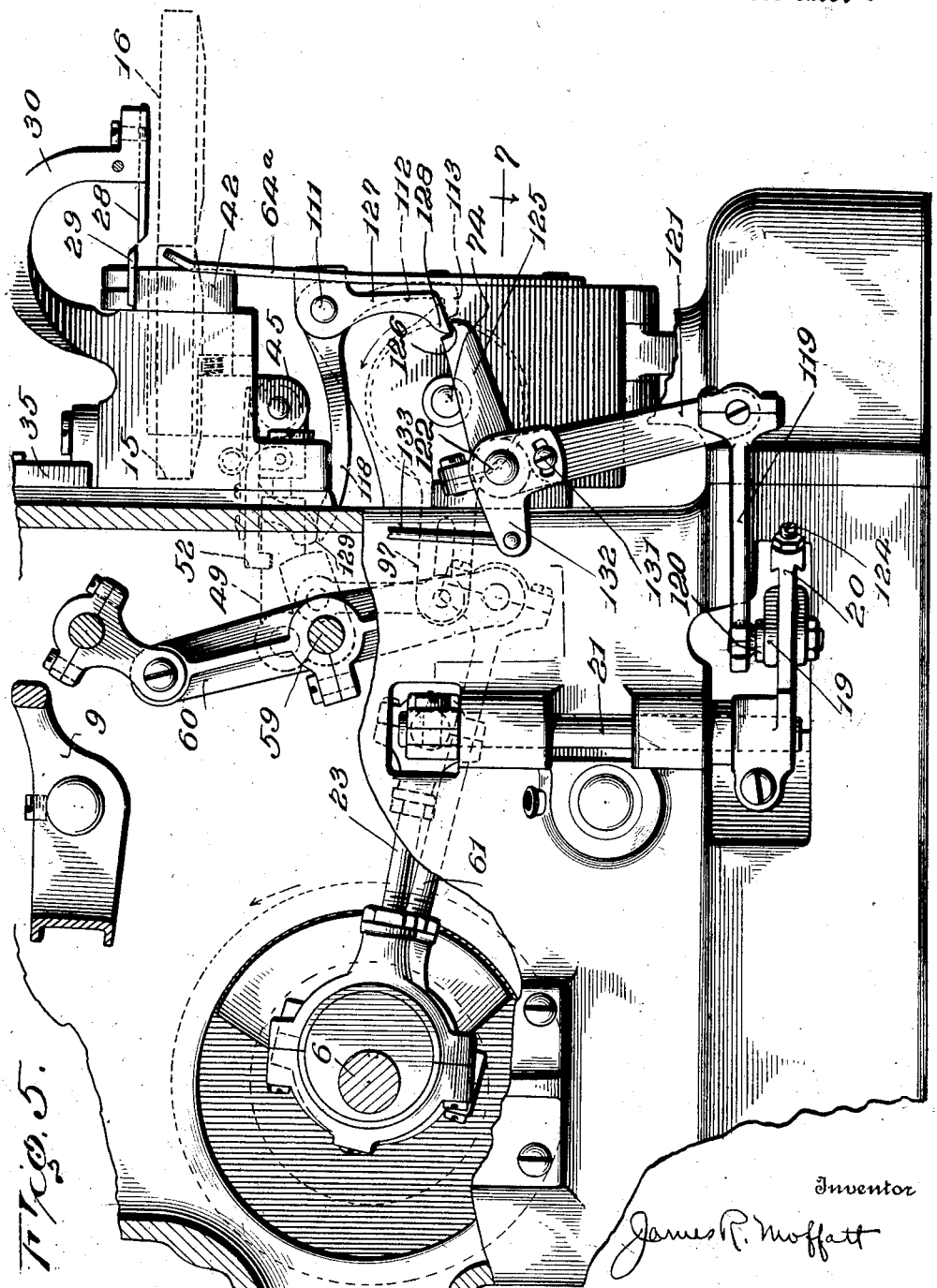

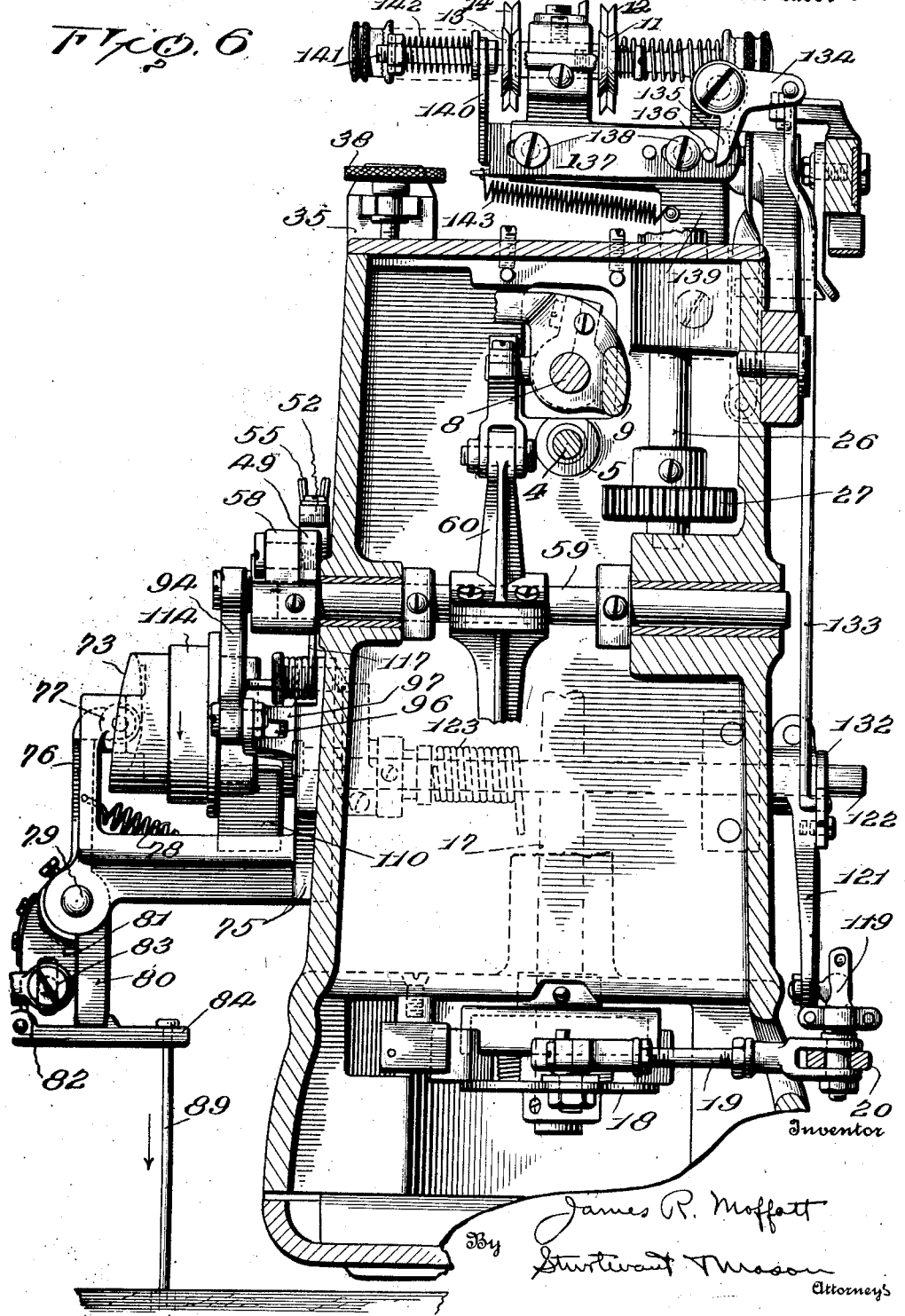

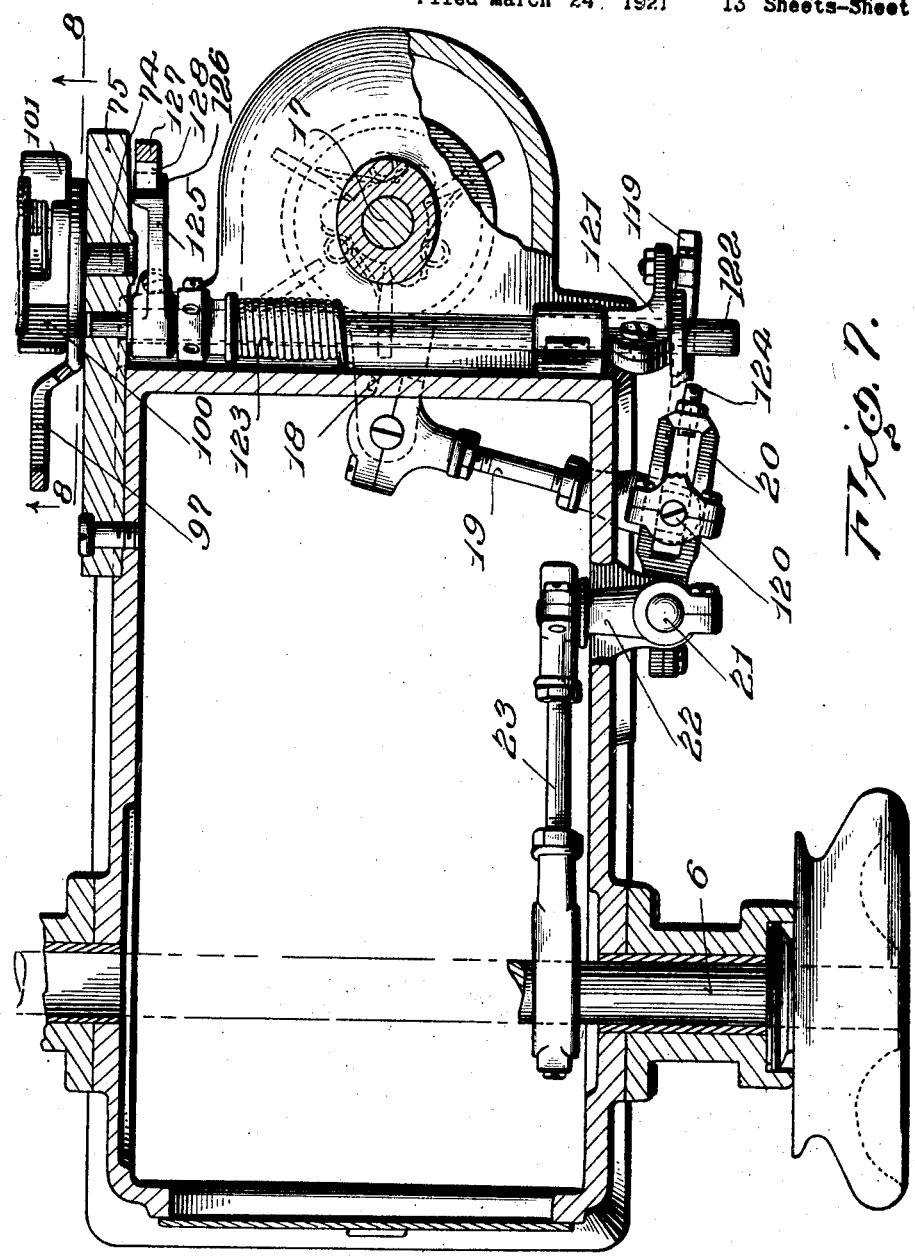

June 10, 1924.
J. R. MOFFATT
1,496,820
SEMIAUTOMATIC HOSE SHAPING MACHINE
Filed March 24, 1921 13 Sheets-Sheet 8
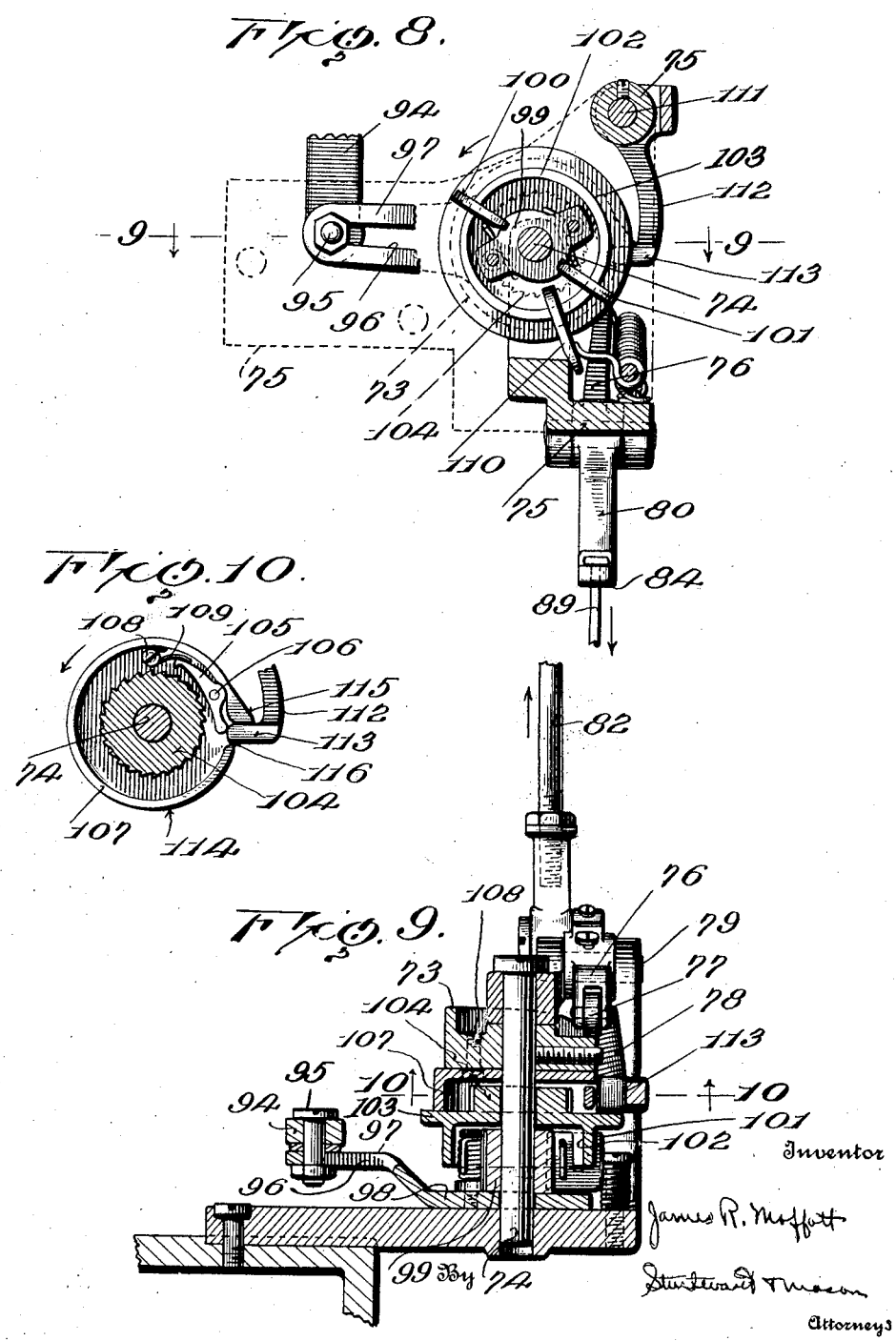

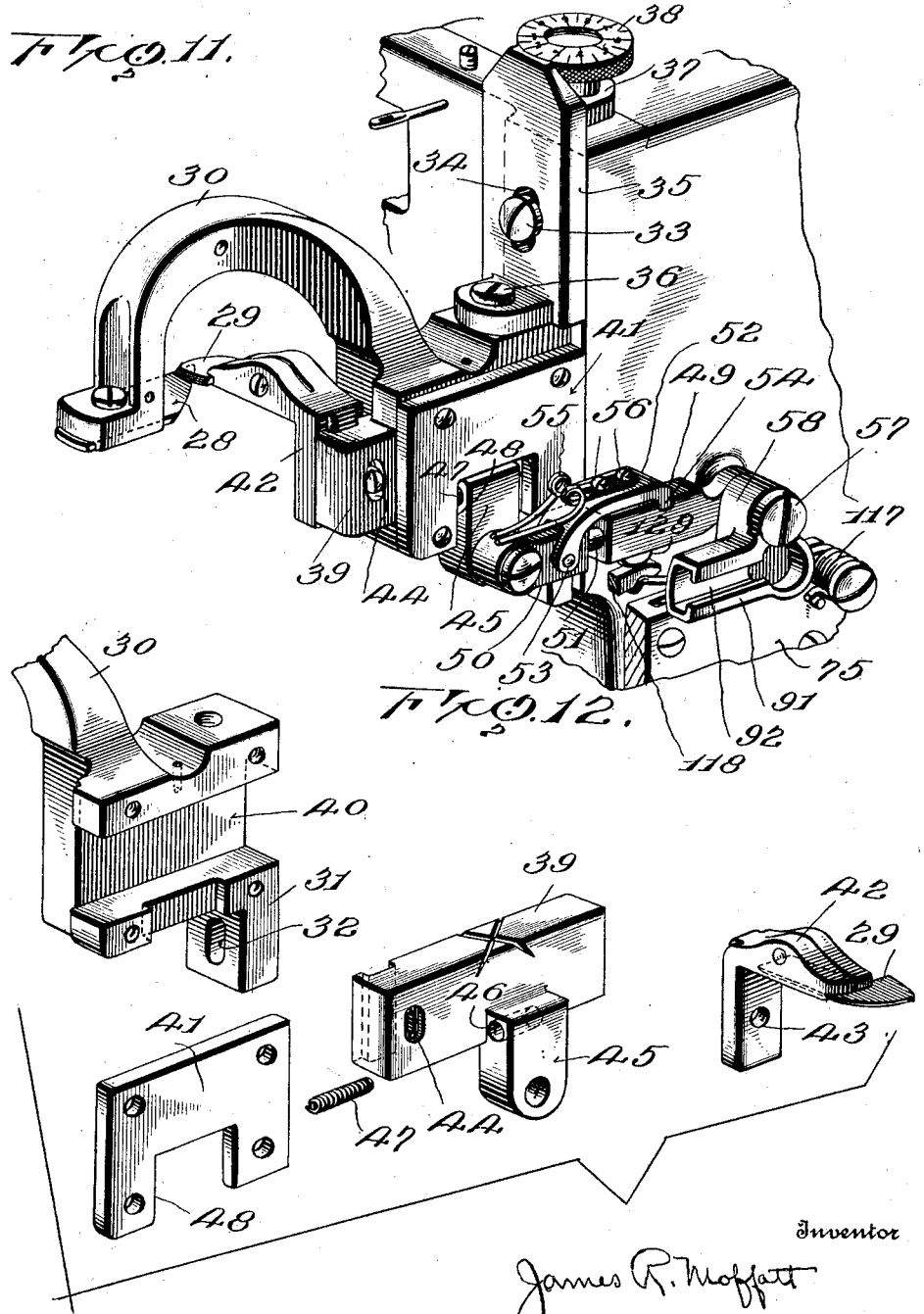

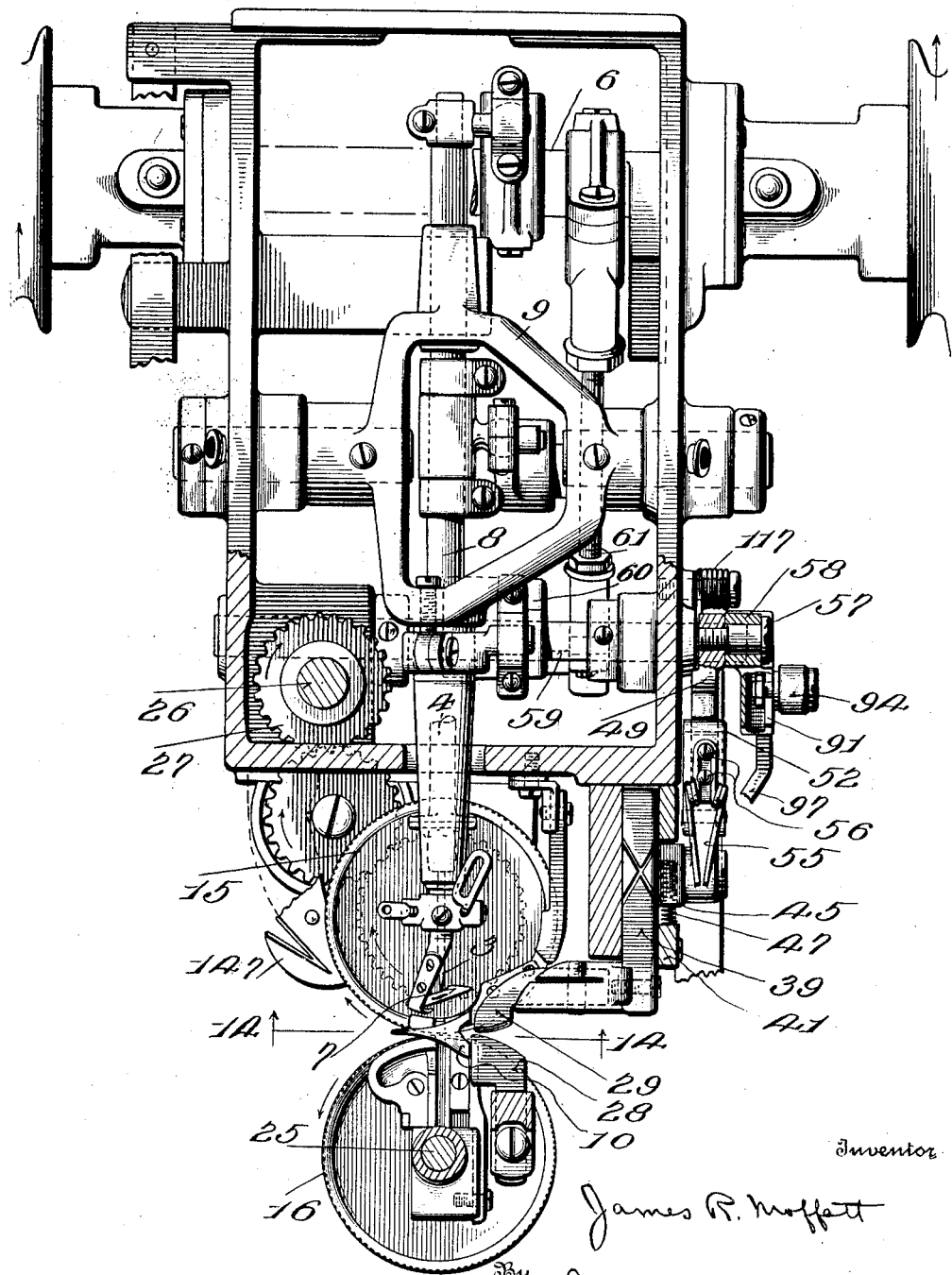

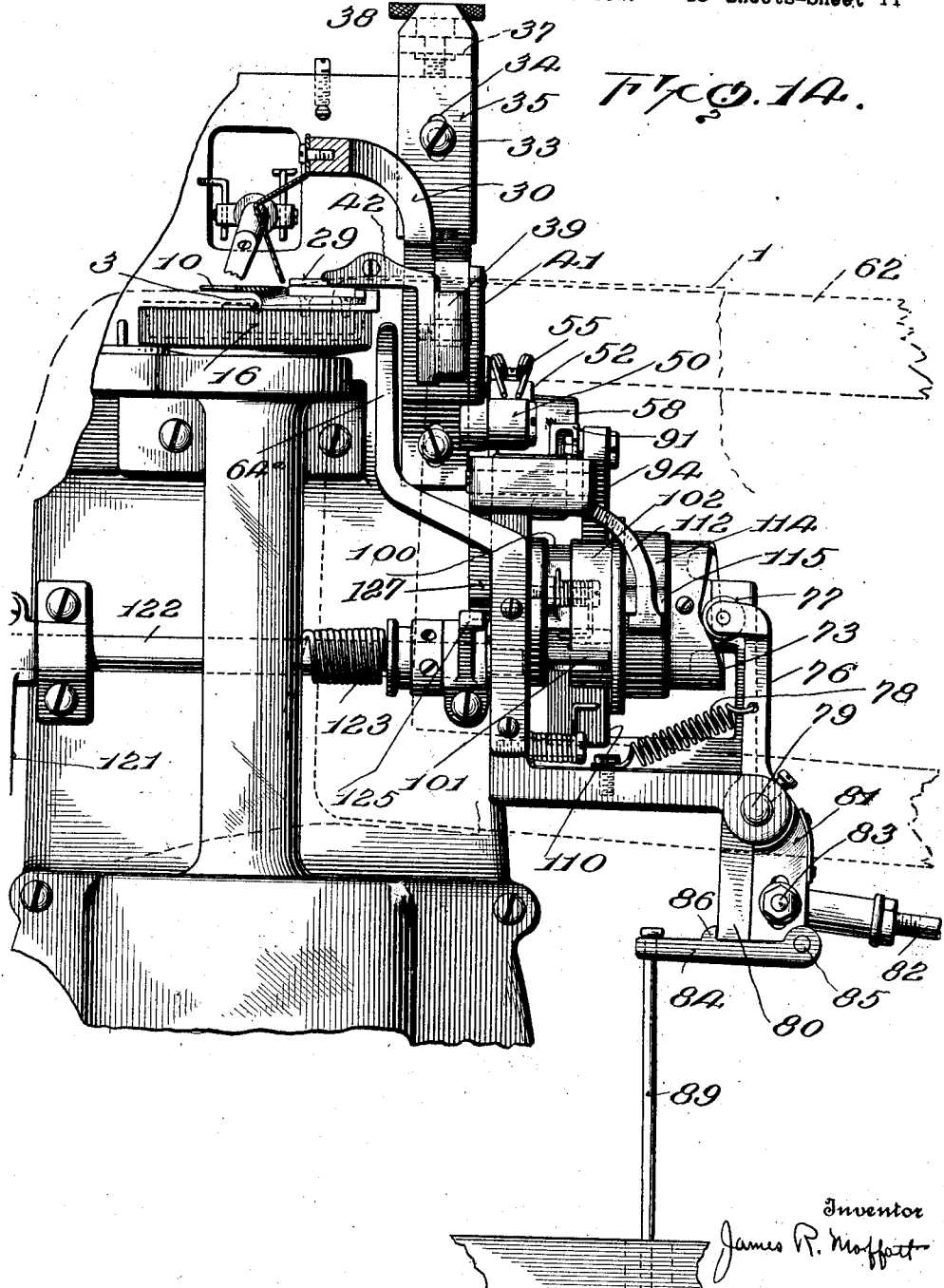

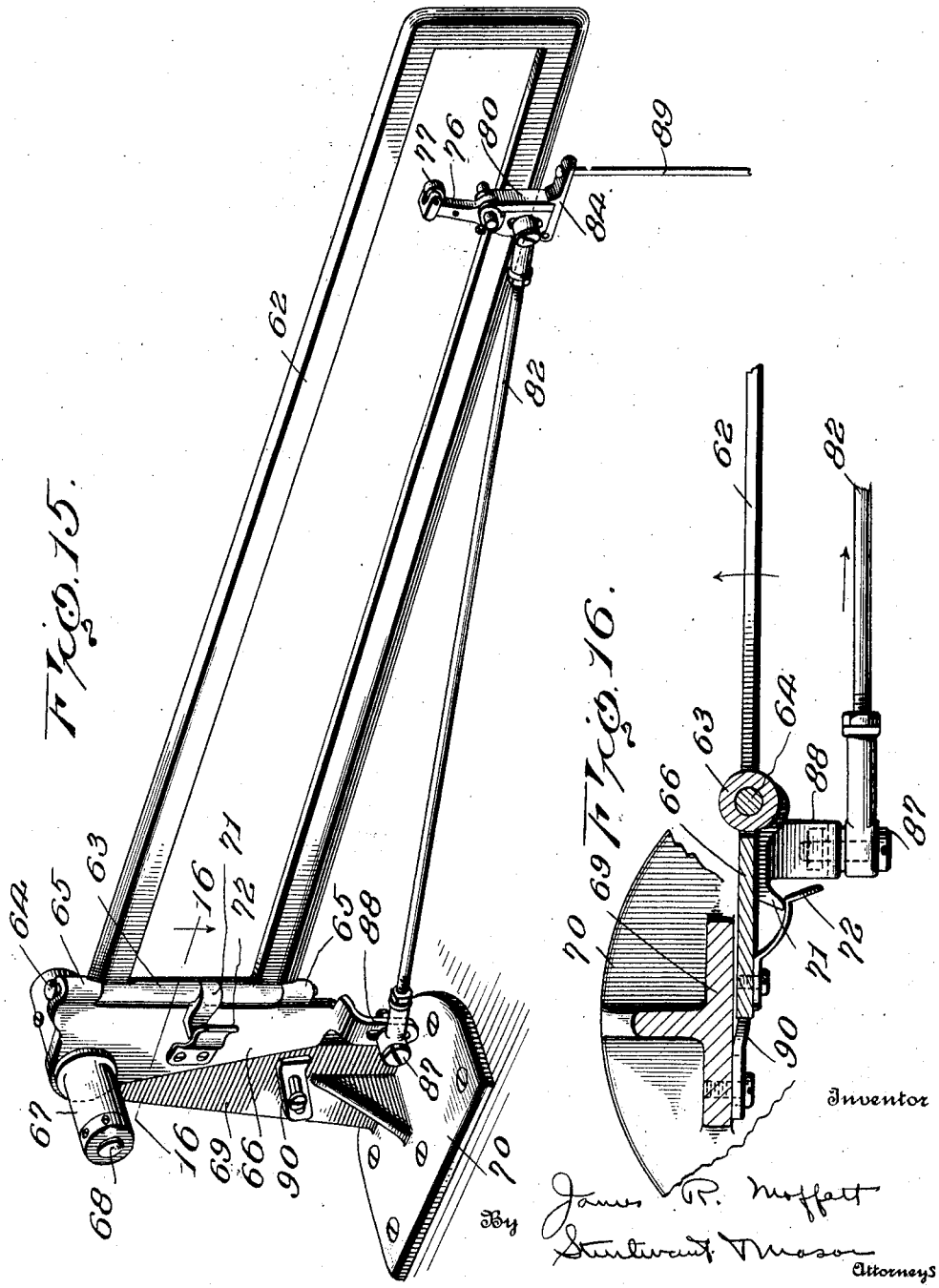

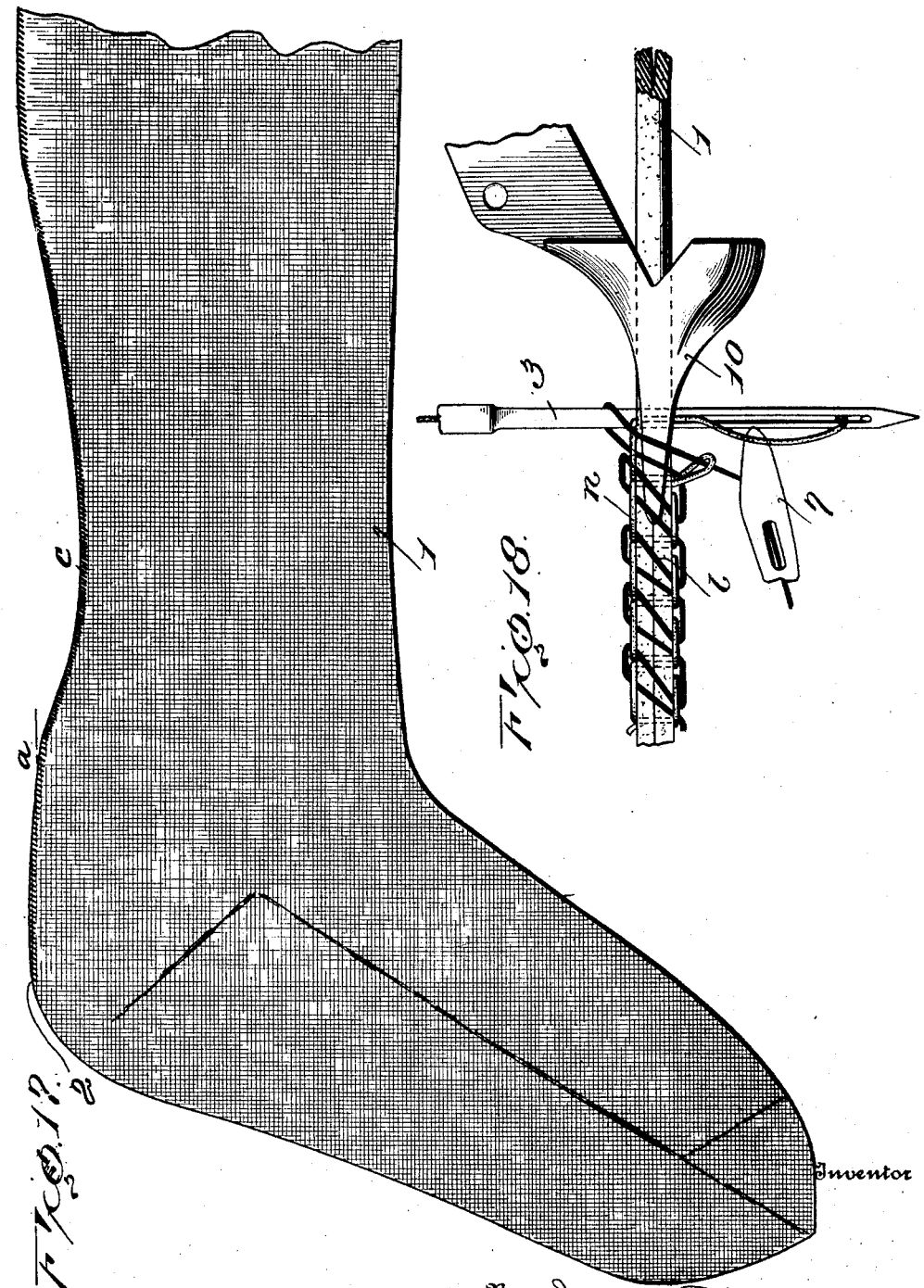

Patented June 10, 1924.

1,496,820

UNITED STATES PATENT OFFICE.

JAMES R. MOFFATT, OF CHICAGO, ILLINOIS, ASSIGNOR TO UNION SPECIAL MACHINE COMPANY, OF CHICAGO, ILLINOIS, A CORPORATION OF ILLINOIS.

SEMIAUTOMATIC HOSE-SHAPING MACHINE.

Application filed March 24, 1921. Serial No. 454,985.

*To all whom it may concern:*

Be it known that I, JAMES R. MOFFATT, a citizen of the United States, residing at Chicago, in the county of Cook, State of Illinois, have invented certain new and useful Improvements in Semiautomatic Hose-Shaping Machines, of which the following is a description, reference being had to the accompanying drawing, and to the figures of reference marked thereon.

The invention relates to new and useful improvements in trimming and seaming machines, and more particularly to a machine for shaping by trimming and seaming stockings.

An object of the invention is to provide a machine of the above character with means for automatically cutting out a predetermined portion from a tubular stocking for shaping the same, and for seaming together the trimmed edges simultaneously with the trimming thereof.

A further object of the invention is to provide a machine of the above character with automatic means for throwing out the trimmer at a predetermined time without stopping the stitching mechanism so that the seaming of the stocking may continue.

A further object of the invention is to provide a machine of the above character with means for varying the length of the feed stroke with the throwing in and out of the trimming mechanism.

A further object of the invention is to provide pattern controlled means for shaping the stocking and automatic means for rendering said pattern controlled mechanism idle at a predetermined time for simultaneously throwing out the trimming mechanism and for simultaneously changing the length of feed and releasing the tension on the needle thread.

These and other objects will in part be obvious and will in part be hereinafter more fully disclosed.

In the drawings which show by way of illustration one embodiment of the invention—

Figure 1 is a front view of a machine embodying my improvements;

Fig. 2 is a plan view of the same with a part of the supporting guide for the stocking broken away;

Fig. 3 is a sectional view on the line 3—3 of Fig. 2;

Fig. 4 is a view of the machine from the left-hand side thereof;

Fig. 5 is a view partly in vertical section and partly in side elevation from the left side of the machine, the section being taken in front of the trimming blades;

Fig. 6 is a sectional view on the line 6—6 of Fig. 4;

Fig. 7 is a sectional view on the line 7—7 of Fig. 5;

Fig. 8 is a sectional view on the line 8—8 of Fig. 7;

Fig. 9 is a sectional view on the line 9—9 of Fig. 8;

Fig. 10 is a sectional view on the line 10—10 of Fig. 9;

Fig. 11 is a perspective view showing the trimming mechanism and the portion of the frame of the machine supporting the same;

Fig. 12 is a perspective view of certain parts of the trimming mechanism, the parts being separated for the sake of clearness;

Fig. 13 is a view partly in plan and partly in horizontal section, substantially on the line 13—13 of Fig. 3;

Fig. 14 is an enlarged sectional view on the line 14—14 of Fig. 13;

Fig. 15 is a perspective view of the stocking support and guide;

Fig. 16 is a sectional view along the line 16—16 of Fig. 15;

Fig. 17 is an enlarged detail showing a stocking trimmed and seamed on my improved machine, and Fig. 18 is an enlarged detail showing the stitching devices and the stitches formed thereby.

The invention is directed to a machine for trimming and seaming, and more particularly to a machine for trimming tubular knit stockings for shaping the same, and for simultaneously seaming the trimmed edges. The invention preferably includes mechanism whereby the stocking may be shifted as it is trimmed so as to shape the stocking and includes means for automatically controlling the shifting of the stocking for the shaping of the same; means for automatically throwing out of action the trimming mechanism and the pattern cam for controlling the shaping of the stocking at predetermined times. The machine also includes means for automatically varying the length of stitch when the trimming stops, so that the stitching may be continued up the leg of the stocking forming an imitation seam. The machine also includes means for releasing the tension when the length of feed is increased.

Referring to Fig. 17, I have shown a stocking at 1 wherein the leg portion is cut from the point *a* to the point *b*. The seam *c* for the stocking begins at 2 and extends up the entire leg of the stocking. From the point 2 to the point *a*, the fabric is not cut, and therefore the seam is an imitation or a false seam until the point *a* is reached. At the point *a*, the trimming members are set into operation and the stocking is trimmed on the curved line *a—b*. When the trimming devices are set into operation, the length of feed is shortened and the tension on the needle thread is slightly increased so that a good, firm, durable uniting or covering seam is formed for uniting and covering the trimmed edges as they are trimmed. A controlling cam gradually shifts the guide for the stocking so that the stocking is shaped according to the shaping of the controlling cam. When the point *b* is reached, automatic means controlled by the machine throws the trimming devices out of action, also lengthens the feed and releases the tension on the needle thread, and the seaming continues, but from the point *b* on, the seam is an imitation or false seam, as the stocking is not trimmed. It is understood, of course, that the stocking which is being shaped is the ordinary tubular stocking which is of substantially the same diameter throughout the entire length, and the purpose of the invention is to produce a stocking which is shaped throughout the ankle portion and which has the appearance of being shaped and seamed throughout the substantial entire length of the leg portion thereof.

The invention will be described under the various groups of mechanisms which have been brought together in the creating of a machine for carrying out the functions described.

*Stitching mechanism.*

The stitching mechanism consists of a needle 3 which is carried by a horizontally disposed needle bar 4 which reciprocates in suitable bearings in a housing or frame 5. Said needle bar receives its reciproction from a main shaft 6 carried by the main frame or housing. Cooperating with the needle 3 is a thread carrying looper 7. The looper 7 is carried by a rod 8 which is mounted in bearings carried by a yoke 9. The looper is given the usual movements for moving the same into the needle loop on one side of the seam, after which the looper moves to the other side of the seam where it presents the looper thread for the entrance of the needle.

In Fig. 18 of the drawings, I have shown more or less diagrammatically the needle and looper and the seam formed thereby. The needle thread is indicated at *n* and the looper thread is indicated at *l*. The stocking is indicated in this figure at 1 and the stitch finger over which the stitches are formed is indicated at 10. The needle thread *n* is led from the supply through suitable guides to an auxiliary tension 11, thence to a main tension 12, and thence through suitable guides to the needle. The looper thread is led through an auxiliary tension 13, thence through a main tension 14 and thence through suitable controlling guides to the looper. The stitch forming mechanism forms no part of the present invention per se, and further description thereof is not thought necessary.

*Feeding mechanism.*

The material is supported and fed to the stitching mechanism by two cooperating horizontally disposed feed cups 15 and 16. The feed cup 15 is carried by a vertical shaft 17 which is given an intermittent movement by means of an oscillating clutch member 18, and this clutch member is vibrated by means of a link 19 which is connected to a slotted arm 20 carried by a vertical shaft 21, which shaft also carries an arm 22 to which is attached an eccentric strap 23 cooperating with an eccentric on the main shaft 6. The outer feed cup 16 is carried by a vertically disposed shaft mounted in an arm 24 and rotated intermittently by a flexible shaft 25. The flexible shaft 25 is connected to a vertical shaft 26, see dotted lines, Fig. 4, and this vertical shaft 26 carries a gear 27 which is driven from a gear on the shaft 17. As the main shaft rotates, it will impart an oscillation to the vertical shaft 21, and through the arm 20 will oscillate the friction clutch and thus impart a step by step movement to the feed cups. The arm 20 is slotted and the link 19 is capable of being shifted along the slot in the arm 20, and when said link is moved outwardly away from the center of the shaft 21, the stroke imparted to the cup feed wheels will be increased, and when it is moved inwardly toward the center of the shaft 21, the stroke imparted to the feed wheels will be decreased. This feeding mechanism per se, forms no part of the present invention, and further description thereof is not thought necessary.

*Trimming mechanism.*

The material is trimmed in advance of the stitching mechanism by two cooperating trimming blades 28 and 29. The blade 28 is a stationary blade and is fixed to an overhanging arm 30 which in turn is formed integral with a bracket 31 (see Fig. 12). This bracket 31 is secured to the frame of the machine by a screw passing through a vertically elongated slot 32 and by a screw 33 passing through a vertically elongated slot 34 formed in a plate 35 which in turn is secured to the bracket 31 by means of a screw 36. Said plate 35 has a rearwardly extending lug 37 through which an adjusting bolt 38 passes. This adjusting bolt 38 is threaded into the frame, and is provided with a collar engaging the under face of the lug 37 so that when the adjusting bolt is turned, the plate 35 will move bodily with the bolt. The trimming blades are raised and lowered by means of this adjusting bolt, first having loosened the clamping bolt 33 and the clamping bolt passing through the slot 32. The movable trimming blade 29 is carried by a slide 39 which is mounted to move in a guideway 40 formed in the bracket 31. A cover plate 41 covers the guideway and permits the free movement of the slide 39. The movable blade 29 is clamped to a supporting shank 42 which in turn is clamped to the slide 39 by a bolt threaded into the opening 43. This bolt passes through an elongated slot 44 in the slide 39 which permits of a limited adjustment for the blade 29 to bring it into proper shearing contact with the stationary blade 28. The slide 39 is provided with a depending lug 45. Said lug is formed with a recess 46 in which seats a spring 47. The outer end of the spring 47 bears against a vertical wall 48 of the cover plate 41. Pivotally connected to the depending lug 45 is a two-part link. Said link consists of a section 49 in the form of a sleeve, and a section 50 carrying a rod 51 adapted to move freely in the sleeve 49. A latch 52 is pivoted at 53 to the section 50 and is provided with a nose 54 adapted to seat in a recess formed in the upper face of the section 49. The spring 55 secured by suitable screws 56 to the latch, bears on the section 50 of the link, and yieldingly forces the nose of the latch into the recess of the sleeve 49. The link is pivoted at 57 to an oscillating arm 58. The oscillating arm 58 is fixed to a shaft 59, and this shaft 59 carries a lever 60 located within the housing or frame of the machine. The lower end of this lever is connected to an eccentric strap 61 which cooperates with an eccentric on the main shaft 6. The upper end of the lever 60 is connected to the looper shaft for imparting one of the movements thereto. This shaft 59 continues to oscillate during the entire operation of stitching the stocking, and therefore, the arm 58 will also be a continuously oscillating arm through the entire running of the machine. When the latch is in engagement with the recess in the section 49 of the link, then the parts of the link are rigidly connected together, and then the oscillations of the arm 58 will cause the slide 39 to reciprocate, and thus impart movement to the trimming blade 29 for severing the material. When the latch 52 is raised, then the two sections of the link are disconnected and the spring 47 will move the slide 39 to its extreme retracted position where it will remain while the section 49 freely reciprocates back and forth on the rod 51, which forms a part of the front section 50 of the link.

It will thus be seen that I have provided a trimming mechanism which may be thrown into and out of operation.

Stocking guide.

The stocking to be trimmed is slipped on to a guide frame 62. Said guide frame consists of upper and lower bars which are connected at their outer and inner ends, and the vertical connecting portion 63 at the extreme right hand end of the stocking frame as viewed in Fig. 1, is pivoted to swing on a pintle 64 passing through lugs 65, 65 formed as a part of a bracket arm 66 which is provided with a laterally extending bearing sleeve 67 mounted upon a fixed stud 68 carried by a standard 69, which in turn is supported by a base plate 70 secured by suitable screws to the table which carries the machine. The stocking guide can be swung horizontally on the pintles 64 and it can be also swung vertically on the stud 68. Said guide is swung horizontally about the pintle for the purpose of placing the stocking on the guide. After the stocking has been placed on the guide with the rear part of the leg portion at the top of the guide, it is then swung into normal position relative to the machine and the lug 71 carried by the frame will engage underneath the spring clips 72 carried by the bracket 66 which yieldingly holds the guide in normal position so that the stocking will pass off from the guide and between the feed cups. A stationary bracket arm 64ª engages the stocking supporting frame adjacent the forward end thereof and serves to aline the same with the feed cups, see Figs. 4 and 14.

Pattern mechanism for shaping stocking.

As above noted, the guide is capable of being swung up and down vertically and is movable in a vertical plane parallel with the axes of the feed cups and the stocking passing off from the guide, passes first to the trimming devices and thence to the stitching mechanism, the extreme upper edge of the stocking passing underneath the stitch finger. It will readily be seen that when the stocking supporting guide is raised, the trimmers will engage the stocking coming off from the frame, and if the frame is lifted step by step, the line of trimming will pass deeper into the stocking, and then again when the guide is lowered step by step, it will come out of the body of the stocking, thus producing a severing of the stocking on the curved line *a—b* as indicated in Fig. 17 of the drawings. The frame is raised and lowered step by step by means of a pattern cam 73. This pattern cam 73 is rigidly mounted on a rod 74 (see Fig. 9) which is supported by a bracket 75 attached to the frame or housing of the machine. An arm 76 carries a roller 77 which bears on this cam 73. Said cam is a face cam and as it turns it normally forces the arm 76 to the right, as viewed in Fig. 14. A spring 78 holds the roller 77 in contact with the cam 73. The arm 76 is pivotally supported by a pintle 79 and has a downward extension 80 which, with the arm 76 constitutes a lever. Loosely mounted on this same pintle 79 is an arm 81. A link 82 is pivoted at 83 to the arm 81. A latch 84 is pivoted at 85 to the arm 81 and is provided with a lug 86 adapted to engage the left-hand face of the extension 80 of the arm 76, thus locking the arm 76 and the arm 81 together, so that they move as one. The other end of the link 82 is pivoted at 87 to a slotted arm 88 carried by the bracket arm 66. When the outer end of the arm 76 is forced outwardly by the rotation of the cam 73, the link 82 will be moved to the left as viewed in Fig. 14 or to the right as viewed in Fig 15, and this will swing the stocking guiding frame upwardly. On the other hand, when the arm 76 moves to the left through the action of the spring 78 and the turning of the cam 73, then the stocking supporting frame will be swung downwardly.

The latch 84 is connected to the rod 89, which in turn is connected either to a treadle or knee shift, and when the latch 84 is depressed by the treadle so as to disconnect the arme 81 from the arm 76, then the stocking guiding frame will swing until the bracket arm 66 strikes an adjustable stop 90 carried by the standard 69. The purpose of this is to lower the frame so that it may be swung underneath and in front of the outer feed cup for the loading of the stocking thereon. After it has been returned to its normal position, it is then raised to a position substantially on a level with the trimming blades. Here it remains during the stitching of the false or imitation seam, and when that part of the stocking is reached which is to be shaped, then the pattern cam is thrown into operation and it will gradually raise the stocking guide to the maximum height, and then gradually lower it again to normal position, after which the cam is automatically thrown out of action and the guide will remain in this normal position allowing the stocking to be fed off from the same while the stitching continues along the leg portion of the stocking.

The means for rotating the pattern cam 73 will now be described. Attention is directed particularly to Figs. 3, and 8 to 10, inclusive. Rigidly secured to the oscillating arm 58 is an arm 91 provided with a radial slot 92. A pivot pin 93 is adjustably mounted in this slot 92. A link 94 is connected at its upper end to said pivot pin 93 and at its lower end to a pivot pin 95 adjustable in a slot 96 formed in an arm 97 projecting outwardly from a disk 98. This disk 98 as clearly shown in Figs. 8 and 9, is provided with a hub 99 which is adapted to cooperate with friction gripping members 100 and 101. These friction gripping members engage a projecting collar 102 carried by a disk 103 freely mounted on the rod 74. The disk 103 is formed with a ratchet hub 104 with which a pawl 105 is adapted to cooperate. This pawl 105 is pivoted at 106 to a cup 107 which is secured by means of a bolt at 108 to the cam 73. The pawl is forced into locking engagement with the ratchet hub 104 by means of a spring 109. As the arm 58 oscillates it will impart an oscillation to the disk 98 and the disk 98 through the friction gripping plates 100 and 101 will intermittently rotate the disk 103, and this disk 103, when locked by the pawl 105 to the cup 107, will intermittently rotate the cam 73. A gripping plate 110 operates to prevent retrograde movement of the cam. When the pawl 105 is thrown out of engagement with the ratchet hub 104, then the cam 73 will be unlocked from the disk 103 and said disk will intermittently rotate without imparting any movement to the cam 73. Thus I have provided means whereby this cam 73 may be rendered idle, notwithstanding the fact that the actuating devices therefor continue their movement.

*Automatic control for trimmers, shaping cam, feeding mechanism, and needle thread tension.*

I have provided means for automatically disconnecting the shaping cam from the actuating mechanism therefor at a predetermined time, and this automatic mechanism includes an arm 112, having a nose 113 which rides on a surface cam 114 formed as a part of the cup 107 carrying the pattern cam. This arm 112 is pivotally supported on a pin 111 fixed to the bracket 75. This surface cam 114 has an outwardly extending cam shaped surface 115. The cup 107 rotates in the direction indicated by the arrow in Fig. 10. The nose 113 is spring pressed against the surface of the cam 114 and the arm 112 will be swung outwardly by means of the cam portion 115, and when the nose drops off from this cam portion 115, it passes into an opening 116 and bears against the pawl 105 and moves the pawl so as to disengage it from the ratchet hub. The outward movement just described of the arm 112 is brought about by the cam portion 115 and the arm 112 is given its extreme movement in the other direction through the action of a spring 117. (See Fig. 3.) This spring 117 bears against an arm 118 which is formed as a part of the arm 112, and raising the arm 118 serves to move the arm 112 so as to press the nose thereof into contact with the surface cam 114.

As above noted, the length of the feed depends upon the position of the pivot bolt connecting the link 19 with the slotted arm 20. This pivot bolt is shifted in the slot by means of a link 119 which is connected by a ball stud 120 formed as a part of the pivot pin and also to an arm 121 fixed to a shaft 122. This shaft 122 is mounted in suitable bearings attached to the main housing as clearly shown in Fig. 7, and a coiled spring 123 surrounding said shaft normally tends to rock the shaft 122 so as to move the pivot pin for the link 19 to the extreme outer end of the slot in the arm 20. A stop screw 124 determines the extent of the outward movement of the pivot pin and this stop screw is adjustable. When the trimming devices are in action, the movement of the arm 20 will not impart movement to the arm 121 because the link 119 will merely swing on its ball connections. Rigidly secured to the shaft 122 is an arm 125 having a projecting lug 126. Formed as a part of the arm 112 is a depending arm 127 which is provided with a nose 128 adapted to engage in rear of the lug 126 when the trimming devices are in action and restrain the shaft from movement through the action of the coiled spring. The normal position of the controlling devices, in which the trimming mechanism is inactive is shown in Fig. 4. The operator pressing on the outer end of the arm 121, forces the pivot pin to the inner end of the slot in the arm 20, and during this movement the nose 128 rides over the curved outer end of the lug 126 and will drop behind the lug, due to the action of the spring 117, which is constantly forcing the arm 112 to the left as viewed in Fig. 4. When the nose 128 slips in behind the lug 126, the movement of the arm 112 is limited thereby so that the nose 113 does not engage the pawl 105, and as a consequence, the cam 73 will be locked up to its actuating mechanism and will begin its intermittent rotation. It will thus be seen that by pushing in on the lower end of the arm 121, not only shortens the feed but sets the pattern cam into actuation, and it will continue to actuate until the cam has made a complete rotation and the cam 115 operating upon the arm 112 swings the arm 127 to the right as viewed in Fig. 5, so as to release the arm 125 and then the spring will throw the arm 121 outward increasing the length of feed and permitting the arm 112 to swing inwardly to a point so as to release the pawl 105 and disconnect the pattern cam from its actuating mechanism. The inward movement of the arm 112 is brought about by an upward movement of the arm 118. This arm 118 in its upward movement engages a depending arm 129 rigidly carried by the latch 52, and raises the latch so as to disconnect the outer section 50 of the link from the inner section 49 thereof, and thus stops the trimming mechanism. When the arm 118 is depressed through the outward movement of the arm 127, then the latch is released and the spring controlling the latch will couple up the sections of the link for operating the trimming blades. The inward movement of the arm 121 therefore accomplishes several functions. First, it decreases the length of feed; second, it connects the pattern cam to its actuating mechanism, and third, throws the trimming mechanism into operation. The inward movement of this arm 121 secures still a fourth function, and that is, to place an additional tension on the needle thread. Loosely mounted on the shaft 122 is a plate 130. Said plate is secured to the arm 121 by a screw 131, which passes through a slot in the plate. Said plate carries an arm 132 which in turn is connected to a rod 133 and this rod, at its upper end is pivotally connected to a rock arm 134. Said rock arm 134 has a depending arm 135 adapted to engage a pin 136 carried by a sliding plate 137. Said sliding plate is mounted on screws 138, which pass through elongated slots on the plate and are threaded into the bracket 139 on which the tensions are mounted. Said plate 137 has an upwardly extending forked arm 140 which straddles a rod 141 carrying a tension spring 142 which normally presses the tension disk 11 into contact with the needle thread. When this bar 137 is moved to the left as viewed in Fig. 6, it will compress the spring 142 and relieve the disk 11 from tension. When the bar 137 is released, a spring 143 will operate to move said bar to the right and permit the spring 142 to exert its normal tension on the disk 11. When the arm 121 is moved inwardly to shorten the feed, the bar 137 is released and the auxiliary tension is applied to the needle thread. When, however, this arm 121 moves outwardly and the feed is increased in length, then the auxiliary tension on the needle thread is likewise released. In order to deflect the trimmed off strip away from the stitching element, I have provided a strip guard 144. This strip guard is provided with a shank 145 and is secured to the overhanging arm 30 by a screw 146 passing through the slot in the shank 145. This strip guard is shaped so as to receive the trimmed off strip and deflects the same toward the front of the machine and entirely away from the stitching element. There is also a thread cutter 147 secured to the machine to facilitate the cutting of the threads between stitched articles.

*Operation.*

It is hardly thought necessary to describe in detail the operation of the machine, as the operation of the various groups of mechanisms have been set forth in the detail description thereof. It may be stated, however, in a summing up, that the operator depresses the latch 84 which releases the stocking supporting frame and permits the same to drop after which it is swung horizontally away from the feed cups and the stocking placed thereon. The frame is then returned to its normal position, the latch connected with the arm 80, which will hold the supporting frame on a level with the upper edges of the feed cups, so that the stocking sliding off from the frame through the intermittent feeding action of the feed cups, will pass underneath the stitch finger and a covering seam formed in the stocking. As above noted, this covering seam is in a sense, a false or imitation seam until the point *a* is reached, for the reason that the trimming devices are idle and the stitches are merely formed in the body of the stocking which is tubular in shape, and therefore, there are no edges to unite. When the point *a* is reached, the operator presses inwardly on the arm 121 which sets into action the pattern cam, the trimming mechanism, decreases the length of feed, and applies the auxiliary tension to the needle thread. As the stitching proceeds, the trimmers will now trim the stocking and the trimmed edges will be simultaneously united and covered by the stitching threads. As the stitching and trimming proceeds the stocking guide will be raised step by step for a period of time, and then again lowered step by step, thus forming or shaping the ankle portion of the stocking, and the particular shaping given, will depend upon the shape of the pattern cam 73. After the pattern cam has made a complete rotation and the stocking is shaped throughout the ankle portion, the edges united and covered, then the machine automatically stops the pattern cam, stops the trimming mechanism, increases the length of feed, and decreases the tension on the needle threads. At this time, the stocking frame has returned to normal position, where it remains, as the lifting cam therefor is idle, and the stitching continues up the leg of the stocking, again making a false or imitation seam, as there are no edges to unite. It will thus be seen that I have provided a machine wherein the stocking may be seamed throughout the entire leg portion thereof and shaped through the ankle portion.

It is obvious that the machine may be used for other purposes than for the shaping and stitching of stockings, and that the details of construction and the arrangement of the parts may be widely varied without departing from the spirit of the invention as set forth in the appended claims.

Having thus described the invention, what I claim, as new and desire to secure by Letters Patent, is—

1. The combination of stitch forming mechanism, a feeding mechanism, a trimming mechanism, a mechanism operating at a predetermined time for automatically throwing out the trimming mechanism without stopping the stitching mechanism, said mechanism for automatically throwing out the trimming mechanism including means for increasing the length of feed when the trimming mechanism is thrown out of operation.

2. The combination of stitch forming mechanism, a feeding mechanism, a trimming mechanism, a guide along which the material moves to the stitch forming mechanism and means for shifting the guide along which the article moves step by step, first in one direction and then in the other for cutting out a section on a curved line.

3. The combination of stitch forming mechanism, a feeding mechanism, a trimming mechanism, means for shifting the article being stitched step by step, first in one direction and then in the other for cutting out a section on a curved line, and means for automatically throwing out the trimming mechanism at a predetermined time without stopping the stitching mechanism.

4. The combination with stitch forming mechanism, a feeding mechanism and a trimming mechanism; of means for shifting the article being trimmed step by step, first in one direction and then in the other for cutting out a section on a curved line, and means for automatically throwing out the trimming mechanism at a predetermined time without stopping the stitching mechanism and for simultaneously increasing the length of the feed.

5. The combination with stitch forming mechanism, a feeding mechanism and a trimming mechanism; of means for shifting the article being trimmed, step by step, first in one direction and then in the other for cutting out a section on a curved line, and means for automatically throwing out the trimming mechanism at a predetermined time without stopping the stitching mechanism and for simultaneously throwing out of action the means for shifting the article being trimmed.

6. The combination with stitch forming mechanism, a feeding mechanism and a trimming mechanism, of means for shifting the article being trimmed step by step, first in one direction and then in the other for cutting out a section on a curved line, and means operating at a predetermined time for throwing out the trimming mechanism, stopping the lateral shift of the article being trimmed, and for changing the length of feed.

7. The combination of stitch forming mechanism, a feeding mechanism, cooperating trimming members, means for reciprocating one of said members, means whereby said reciprocating trimming member may be disconnected from its operating means, means for shifting the article being stitched step by step, first in one direction and then in the other for cutting out a section on a curved line, and manually controlled means for throwing the trimmer operating means into action.

8. The combination of stitch forming mechanism, a feeding mechanism, and cooperating trimming members, means for reciprocating one of said members, means for disconnecting said reciprocating member from its operating means, a guide, normally inactive means for shifting the guide, first in one direction and then in the other for causing the article to be cut on a curved line, and manually controlled means for connecting the reciprocating trimming member to its operating means and for setting into action the means for shifting the guide.

9. The combination with overseaming stitching mechanism, of a feeding mechanism, cooperating trimming blades located in advance of the stitching mechanism, means for guiding the article being stitched, means for shifting the guide step by step, first in one direction and then in the other for causing a curved section to be cut from the article being stitched, and means for automatically throwing out of action the shifting means for the guide and for rendering the trimming mechanism inoperative.

10. The combination with overseaming stitching mechanism, of a feeding mechanism, cooperating trimming blades located in advance of the stitching mechanism, means for guiding the article being stitched, means for shifting the guide step by step, first in one direction and then in the other for causing a curved section to be cut from the article being stitched, and means operating at a predetermined time for automatically throwing out of action the shifting means for the guide and for rendering the trimming mechanism inoperative, and for increasing the length of feed.

11. The combination of overseaming stitching mechanism, of a feeding mechanism, a stationary trimming blade, a movable blade cooperating with said stationary blade, means for reciprocating said movable blade, automatic means operating at a predetermined time for disconnecting said movable blade from its reciprocating means, means for withdrawing the movable blade from the path of travel of the article when disconnected from its reciprocating means, and means for increasing the length of feed when the movable trimming blade is disconnected from its reciprocating means.

12. The combination of overseaming stitching mechanism, feeding mechanism, a stationary trimming blade, a movable blade cooperating with said stationary blade, means for reciprocating said movable blade, automatic means operating at a predetermined time for disconnecting said movable blade from its reciprocating means, means for withdrawing the movable blade from the path of travel of the article when disconnected from its reciprocating means, a guide for guiding the article being stitched, means for shifting the guide step by step, first in one direction and then in the other for cutting a curved section from the article, and means for automatically throwing out said shifting means for the guide when the movable trimming blade is disconnected from its operating means.

13. The combination of overseaming stitching mechanism including a horizontally arranged needle, feed cups for supporting and feeding an article to the stitching mechanism, trimming blades located in advance of the needle, means for reciprocating one of said blades, and means operating at a predetermined time for automatically disconnecting said reciprocating blade from its operating means.

14. The combination of overseaming stitching mechanism including a horizontally arranged needle, feed cups for supporting and feeding an article to the stitching mechanism, trimming blades located in advance of the needle, means for reciprocating one of said blades, means operating at a predetermined time for automatically disconnecting said reciprocating blade from its operating means, a guide for supporting and directing the article being stitched to the feed cups, and means for raising and lowering said guide step by step for causing the trimming blades to cut a curved section from the article.

15. The combination of an overseaming stitch forming mechanism including a horizontally disposed needle, feed cups for supporting and feeding an article to the needle, horizontally disposed trimming members located in advance of the needle, means for reciprocating one of said trimming members, a guide for supporting and directing the article to the trimming members, and means for raising and lowering said guide step by step, for cutting a curved section from the article being trimmed and stitched.

16. The combination of an overseaming stitch forming mechanism including a horizontally disposed needle, feed cups for supporting and feeding an article to the needle, horizontally disposed trimming members located in advance of the needle, means for reciprocating one of said trimming members, a guide for supporting and directing the article to the trimming members, means for raising and lowering said guide step by step, for cutting a curved section from the article being stitched, and means for automatically disconnecting the reciprocating trimming blade from its operating means and for disconnecting the guide from its shifting means at a predetermined point.

17. The combination of overseaming stitching mechanism including a horizontally disposed needle, cooperating feed cups for supporting and feeding an article held in a vertical position to the needle, a guide for supporting and directing the article to the feed cups, said guide being disposed so that the upper portion of the article passing from the guide will be stitched and covered by overseaming stitches, trimming members located in advance of the needle, means for reciprocating one of said trimming means, means whereby the movable trimming member may be connected to and disconnected from its operating means, means for normally holding the movable trimming member out of the path of the article when disconnected from its operating means, means for raising and lowering said guide step by step whereby a curved section may be cut from the article passing from the guide and the cut edges of the article joined and covered by overseaming stitches, and means for automatically throwing out the shifting means for the guide when the guide returns to normal position so that the edge of the article passing off from the guide will be covered by the overseaming stitches.

18. The combination of overseaming stitching mechanism including a horizontally disposed needle, cooperating feed cups for supporting and feeding an article held in a vertical position to the needle, a guide for supporting and directing the article to the needle, said guide being disposed so that the upper portion of the article passing from the guide will be stitched and covered by overseaming stitches, trimming members located in advance of the needle, means for reciprocating one of said trimming members, means whereby the movable trimming member may be connected to and disconnected from its operating means, means for normally holding the movable trimming member out of the path of the article when disconnected from its operating means, means for raising and lowering said guide step by step whereby a curved section may be cut from the article passing from the guide and the edges of the curved section joined and covered by overseaming stitches, means for automatically throwing out the shifting means for the guide when the guide returns to normal position so that the edge of the article passing off from the guide will be covered by the overseaming stitches, and means for automatically disconnecting the movable trimming member from its operating means when the guide is disconnected from its shifting means.

19. The combination of overseaming stitching mechanism including a horizontally disposed needle, cooperating feed cups for supporting and feeding an article held in a vertical position to the needle, a guide for supporting and directing the article to the needle, said guide being disposed so that the upper portion of the article passing from the guide will be stitched and covered by overseaming stitches, trimming members located in advance of the needle, means for reciprocating one of said trimming members, means whereby the movable trimming member may be connected to and disconnected from the operating means, means for normally holding the movable trimming member out of the path of the article when disconnected from its operating means, means for raising and lowering said guide step by step whereby a curved section may be cut from the article passing from the guide and the cut edges of the article joined and covered by overseaming stitches, means for automatically throwing out the shifting means for the guide when the guide returns to normal position so that the edge of the material passing off from the guide will be covered by the overseaming stitches, and means for automatically disconnecting the movable trimming member from its operating means when the guide is disconnected from its shifting means, and for automatically increasing the length of feed when the trimming member is disconnected from its operating means.

20. The combination of an overseaming stitching mechanism including a horizontally disposed needle, vertically disposed feed cups for feeding an article to the needle, trimming members located in advance of the needle, means for reciprocating one of said trimming members, a guide for supporting and directing the article being stitched, a pattern cam, means for rotating said pattern cam, means controlled by said pattern cam for disconnecting the movable trimming blade from its reciprocating means, and means for automatically stopping the movements of the pattern cam when the trimming blade is disconnected from its reciprocating means.

21. The combination of an overseaming stitching mechanism including a horizontally disposed needle, vertically disposed feed cups for feeding an article to the needle, trimming members located in advance of the needle, means for reciprocating one of said trimming members, a guide for supporting and directing the article being stitched, a pattern cam, means for rotating said pattern cam, means controlled by said pattern cam for disconnecting the movable trimming blade from its reciprocating means, means for automatically stopping the movements of the pattern cam when the trimming blade is disconnected from its reciprocating means, and means controlled by the pattern cam for increasing the length of feed when the trimming blade is disconnected from its operating means.

22. The combination of an overseaming stitching mechanism including a horizontally disposed needle, vertically disposed feed cups for feeding an article to the needle, trimming members located in advance of the needle, means for reciprocating one of said trimming members, a guide for supporting and directing the article being stitched, a pattern cam, means for rotating said pattern cam, means controlled by said pattern cam for disconnecting the movable trimming blade from its reciprocating means, means for automatically stopping the movements of the pattern cam when the trimming blade is disconnected from its reciprocating means, means controlled by the pattern cam for increasing the length of feed when the trimming blade is disconnected from its operating means, and means whereby the length of the feed may be decreased, the pattern cam thrown into operation, and the trimming blade connected with its reciprocating means.

23. The combination of overseaming stitching mechanism including a horizontally disposed needle, vertically disposed feed cups cooperating therewith, trimming members located in advance of said needle, reciprocating means for one of said trimming members including a link having telescoping parts, a latch connecting said telescoping parts, a spring for shifting the movable trimming blade away from the path of the material when the latch is released, and means operating at a predetermined time for automatically lifting the latch to disconnect the trimming member from its reciprocating means.

24. The combination of stitch forming mechanism, a feeding mechanism, and cooperating trimming members, means for reciprocating one of said members, means for disconnecting said reciprocating member from its operating means, a guide, normally inactive means for shifting the guide, first in one direction and then in the other for causing the article to be cut on a curved line, and manually controlled means for connecting the reciprocating trimming member to its operating means and for setting into action the means for shifting the guide, and for decreasing the length of the feed.

25. The combination of stitch forming mechanism, a feeding mechanism and cooperating trimming members, means for reciprocating one of said members, means for disconnecting said reciprocating member from its operating means, a guide, normally inactive means for shifting the guide, first in one direction and then in the other for causing the article to be cut on a curved line, and manually controlled means for connecting the reciprocating trimming member to its operating means, for setting into action the means for shifting the guide, and for decreasing the length of the feed, and automatic means for disconnecting the trimmer from its operating means, stopping the shifting means for the guide, and for increasing the length of the feed.

26. The combination of a horizontal reciprocating needle, feed cups mounted to rotate about vertical axes for supporting and feeding the material to the needle, a guide, means for supporting said guide whereby it may be swung in a vertical plane parallel with the axes of the feed cups, a trimming mechanism disposed between said guide and the needles, and means for raising and lowering said guide for causing the article as it is fed from the guide to be cut on a curved line.

In testimony whereof, I affix my signature.

JAMES R. MOFFATT.